United States Patent
Fano et al.

(10) Patent No.: US 8,069,005 B2
(45) Date of Patent: Nov. 29, 2011

(54) ACTION RECOGNITION AND INTERPRETATION USING A PRECISION POSITIONING SYSTEM

(75) Inventors: Andrew E. Fano, Lincolnshire, IL (US); Chad Cumby, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 187 days.

(21) Appl. No.: 12/683,109

(22) Filed: Jan. 6, 2010

(65) Prior Publication Data

US 2010/0106453 A1 Apr. 29, 2010

Related U.S. Application Data

(63) Continuation of application No. 11/381,902, filed on May 5, 2006, now Pat. No. 7,647,198.

(51) Int. Cl.
*G06F 19/00* (2011.01)
(52) U.S. Cl. .................................................. 702/150
(58) Field of Classification Search .......... 702/150–155; 235/462.2
See application file for complete search history.

(56) References Cited

U.S. PATENT DOCUMENTS 6,400,996 B1 6/2002 Hoffberg
2003/0120183 A1* 6/2003 Simmons ...................... 600/595

OTHER PUBLICATIONS

European Examination Report in Application 07783260.8 issued May 27, 2011.

* cited by examiner

*Primary Examiner* — Edward Raymond
(74) *Attorney, Agent, or Firm* — Vedder Price PC

(57) ABSTRACT

To facilitate the recognition and interpretation of actions undertaken within an environment, the environment is associated with a precision positioning system (PPS) and a controller in communication with the PPS. Within the environment, an entity moves about in furtherance of one or more tasks to be completed within the environment. The PPS determines position data corresponding to at least a portion of the entity, which position data is subsequently compared with at least one known action corresponding to a predetermined task within the environment. Using a state-based task model, recognized actions may be interpreted and used to initiate at least one system action based on the current state of the task model and correspondence of the position data to the at least one known action. In an embodiment, an entity recognition system provides an identity of the entity to determine whether the entity is authorized to perform an action.

18 Claims, 4 Drawing Sheets

ACTION RECOGNITION AND INTERPRETATION USING A PRECISION POSITIONING SYSTEM

CROSS-REFERENCE TO RELATED APPLICATIONS

The instant application is a continuation of U.S. patent application Ser. No. 11/381,902 entitled "ACTION RECOGNITION AND INTERPRETATION USING A PRECISION POSITIONING SYSTEM" and filed May 5, 2006, the entirety of which prior application is incorporated herein by this reference.

FIELD OF THE INVENTION

The present invention relates generally to motion recognition and, in particular, to techniques for recognizing and interpreting actions within an environment using a precision positioning system.

BACKGROUND OF THE INVENTION

Location determination systems are well known in the art. For example, the global positioning satellite (GPS) system may be used to determine the specific locations of GPS receivers with an accuracy down to a few meters. Other land-based location systems are likewise capable of determining a location of an object with a similar degree of accuracy. While such systems work well for the purposes for which they were designed, particularly on a large scale (e.g., hundreds or thousands of meters), they do not necessarily provide greater understanding of the movement and position data that they provide. Stated another way, although such systems can tell you where a particular object is, they cannot help you understand what that object is doing, why the object is moving in a certain way or what the object's next movement should be. Equally significant, because of the accuracy provided, such systems are unable to provide any understanding of actions performed on a human-scale.

More recently developed technologies, such as so-called ultra wideband (UWB) positioning systems, provide the ability to obtain three dimensional position data with much greater accuracy than previously available with the above-described systems. For example, a UWB system can determine the location of an appropriately configured "tag" with an accuracy of approximately one foot or less. This level of resolution may be used to develop a greater understanding of actions (particularly on a human scale) and, equally important, an understanding of what those actions mean within a given environment. However, such systems have not been employed for this purpose. Thus, it would be advantageous to provide a system that incorporates the use of precision positioning determination to recognize and interpret actions undertaken within an environment.

SUMMARY OF THE INVENTION

The present invention provides techniques for recognizing and interpreting actions undertaken within an environment. In particular, an environment under consideration is associated with a precision positioning system (PPS) and a controller in communication with the PPS. Within the environment, an entity moves about in furtherance of one or more tasks to be completed within the environment. For example, the environment may comprise a factory or other industrial setting, and the entity may comprise a worker interacting with elements (e.g., machinery) within the factory. In a presently preferred embodiment, each such entity is equipped with one or more tags, the position of which may be determined by the PPS with a high degree of accuracy. As the entity moves about within the environment, the PPS (in cooperation with the tag) determines position data corresponding to at least a portion of the entity, i.e., the portion equipped with the tag. The position data determined in this manner is subsequently compared with at least one known action corresponding to a predetermined task within the environment. When the results of this comparison are favorable, i.e., the position data is well correlated with a known action, the action is recognized. Using a state-based task model, the recognized action may be interpreted and used to initiate at least one system action based on the current state of the task model and correspondence of the position data to the at least one known action. In an embodiment, an entity recognition system provides an identity of the entity to determine whether the entity is authorized to perform an action.

In another aspect of the present invention, the controller may provide information to the entity based on correspondence of the position data to the at least one known action. The at least one known action may be defined relative to one or more elements residing within or operating within the environment. Further still, a logging controller, in communication with the controller, may be provided to associate captured event data with the recognized action. In this manner, the present invention provides the ability to develop an understanding of particular actions carried out within an environment previously not possible.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION OF THE PRESENT EMBODIMENTS

Figure 1:
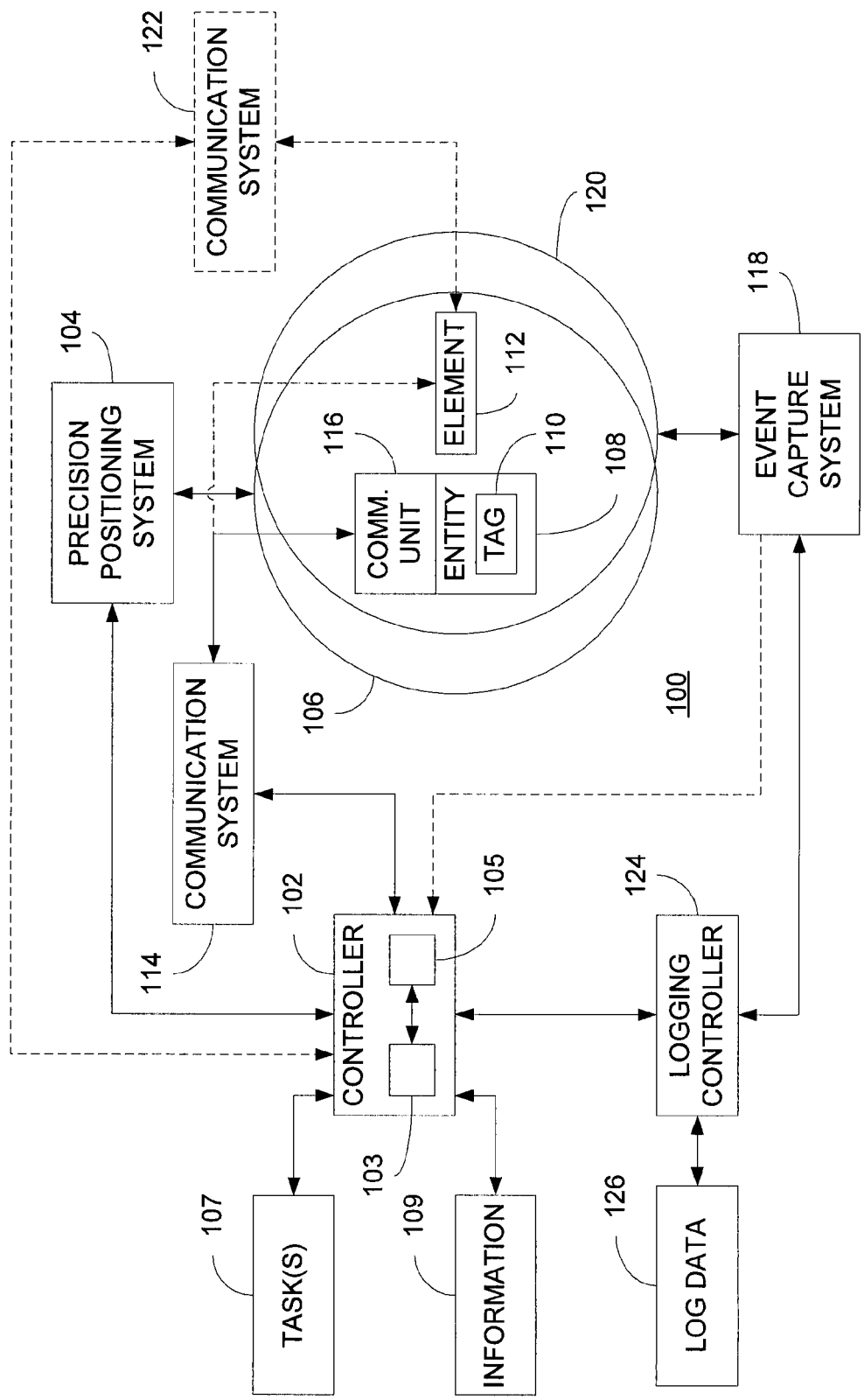
FIG. 1 is a block diagram of a system for recognizing and interpreting actions in accordance with the present invention.

Referring now to FIG. 1, a system 100 for recognizing and interpreting actions in accordance with the present invention is further illustrated. In particular, the system 100 comprises a controller 102 in communication with a precision positioning system (PPS) 104. The positioning system 104 is associated with an environment 106 that, in turn, has one or more entities 108 (only one shown) at least temporarily residing or moving therein. Generally, the controller 102 comprises at least one processor 103 in communication with one or more storage devices 105. In one embodiment, the at least one processor 103, such as a microprocessor, microcontroller, digital signal processor or combinations thereof, operates under the control of instructions stored in the one or more storage devices 105, which may comprise suitable volatile or nonvolatile memory devices such as random access memory (RAM) or read-only memory (ROM). Alternatively, other types of devices, such as programmable logic arrays or application-specific integrated circuits (ASICs) may be used, separately or in combination with each other or the processor, for this purpose. The controller 102 also comprises various components (not shown) for supporting communications with the various other system components shown, e.g., wireless or network interfaces. Additionally, the controller 102 may comprise a user interface allowing a user thereof, such as a system administrator or manager, to control various operational aspects of the system 100 through the controller 102. Techniques for arranging and programming the various components of the controller 102 to perform the operations described herein are well known to those having skill in the art.

Generally, the PPS 104 comprises any system, whether wired or wireless, capable of determining spatial coordinates within a known environment to an accuracy sufficient to distinguish between at least relatively small movements of human extremities, e.g., hand motions, body positioning (erect, bent over, prone), etc. In practice, this translates to an accuracy on the order of one or two feet, or better. Furthermore, the positioning system 104 need not rely on line of sight operation (although this may be equally employed) and, in a presently preferred embodiment, comprises a UWB system. As known in the art, UWB systems are capable of wirelessly discriminating spatial coordinates that are less than one or two feet apart or, in some systems, even as close as a few inches apart.

As noted previously, the PPS 104 is associated with the environment 106. That is, the PPS 104 provides a dimensional breadth of coverage such that the positioning system 104 is able to determine spatial coordinates for entities residing anywhere within the environment 106. Generally, the environment 106 may comprise any physical space that may accommodate the operation of the PPS 104. However, in a presently preferred embodiment, the environment 106 may comprise an industrial setting such as a factory, office, or similar environment. The extent or physical dimensions of the environment is limited only by the capability of the PPS 104 to maintain coverage throughout the entire environment. As shown, the environment may include one or more entities 108 and one or more elements 112. In the context of the present invention, an entity 108 may comprise anything capable of moving within the environment 106, such as a human being or an automated/semi-automated device (e.g., an industrial robot), and performing or participating in performance of tasks, as described below. Additionally, in the context of the present invention, each element 112 may comprise anything that the entity 108 can interact within the environment 106, such as physical objects, whether fixed (e.g., valves, levers, permanent machinery, etc.) or mobile (e.g., hand tools, movable machinery, etc.) or other entities. Furthermore, fixed elements can be in known locations of the environment (in which case, the elements need not be tagged), or locations of mobile elements may be determined through the use of additional tags or through other location determining means known to those having skill in the art. For example, the locations of fixed objects can be known through plans such as blueprints, planograms, etc., or can be detected through machine vision, through barcodes, radio frequency identification (RFID) tags, etc.

As described above, the PPS 104 may comprise any system capable of discriminating sufficiently small distances regardless of the manner in which such discrimination is achieved. However, a presently preferred embodiment incorporates the use of a UWB positioning system that employs the use of one or more tags 110 (only one shown) that is physically associated with the entity 108. Within an exemplary UWB positioning system, the tag 110 comprises an active device that periodically transmits signals used by the positioning system 104 to accurately determine spatial coordinates for the tag 110. This is typically achieved through the use of a plurality of wireless receivers or detectors positioned within or in close proximity to the environment 106 at accurately known locations. Using known techniques, the detectors, in combination with a suitable controller (not shown), determine the spatial coordinates based on the periodic signals transmitted by the tag 110. That is, for each periodic transmission by the tag 110, the PPS 104 can determine spatial coordinates for the tag 110. Collectively, the spatial coordinates output by the PPS 104 constitute position data used by the controller 102 to recognize and interpret actions, as described in further detail below. The tag 110 is physically associated with the entity 108 and, as a consequence, is able to support the determination of relatively precise position data for that portion of the entity with which it is physically associated. For example, one or more suitable tags can be placed in articles of clothing or other equipment (e.g., a hardhat, gloves, boots, etc.). In one embodiment of the present invention, the tag 110 may be physically associated with an extremity of a human, i.e., on a person's head, arms, legs, hands or feet.

As further illustrated in FIG. 1, a communication system 114 may be operatively coupled to the controller 102 to thereby provide a path to a communication unit 116 associated with the entity 108. For example, the communication system 114 may comprise a wireless communication system such as would be employed to support communications with a cellular telephone, a personal digital assistant, a portable computer or any other suitable device capable of providing information to the entity 108. However, the present invention is not limited to any particular implementation of the communication system 114. Optionally, the communication system 114 may also be capable of communicating with one or more of the elements 112 disposed within the environment 106. In this manner, the controller 102 may obtain information, such as operational status or event alarms, from individual elements for use in logging operations described in further detail below. In yet another alternative embodiment, an additional communication system 122, apart from the first communication system 114, may be provided as a wholly separate system for elements 112 to communicate with the controller 102. Once again, the present invention is not limited to any particular implementation of the additional communication system 122.

In furtherance of action recognition and interpretation, the controller 102 is coupled to a first database 107 comprising data structures corresponding to at least one task model. In operation, the controller 102 uses the at least one task model, particularly the one or more known actions defined within each task model, to perform action recognition and interpretation. As used herein, a task is any process incorporating recognizable actions, regardless of complexity, that may be performed by an entity within the environment or portion of the environment. Task models are abstractions of tasks comprising one or more states and known actions that cause transitions between states. Techniques for implementing state-based models as data structures stored in a database are well known in the art.

Figure 4:
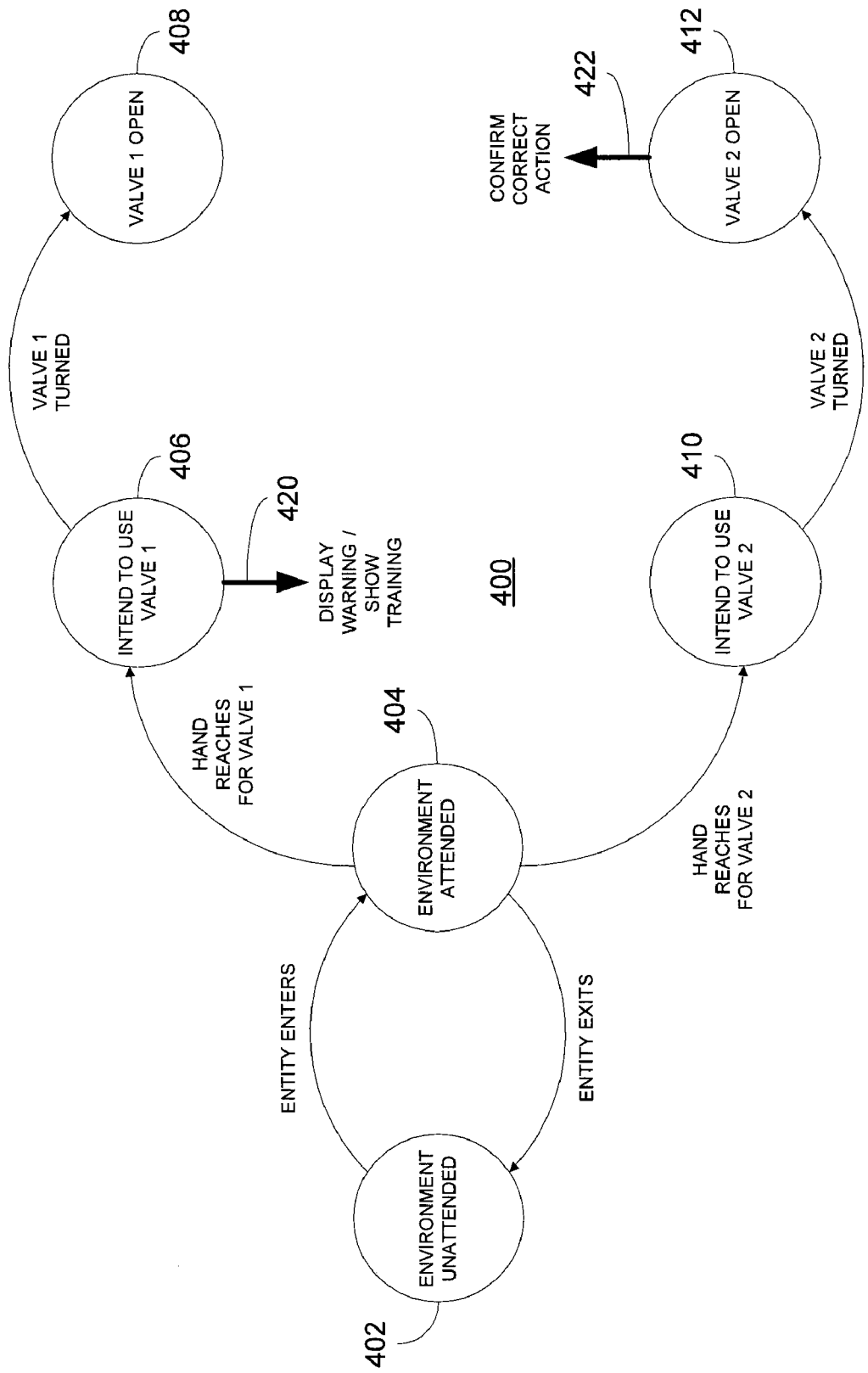
FIG. 4 is an exemplary task model in accordance with the present invention.

An exemplary task model is further illustrated in FIG. 4. As shown therein, the task model 400 comprises a plurality of states 402-412 each describing a particular state that is meaningful to the task being described. Transitions between states are based at least in part upon the occurrence of known or anticipated actions within the environment. To the extent that one or more of the various states may be defined relative to specific elements in the environment, the known actions may be specifically defined relative to a corresponding element. For example, actions that cause state transitions may include, but are not limited to, approaching an element with a velocity within a velocity range, approaching an element at a distance within a distance range, entering or exiting a specific area within the environment, entering or exiting the area in specific directions or residing within an area for a period of time. Additional exemplary actions may include generic movements typically defined relative to a specific element, such as turning, left-to-right or right-to-left movement, forward or backward movement, up or down movement, etc. Furthermore, in addition to single movements (e.g., move up), actions can also be defined as compound movements (e.g., move up and turn) or they can be defined as having a specific length or magnitude (e.g., move left at least two feet). Those having skill in the art will appreciate that a broad range of specific actions to be recognized may be defined in a variety of ways as a matter of design choice.

Referring once again to the specific example shown in FIG. 4, in a first state 402 entitled "environment unattended", the action of an entity entering into the environment causes a transition to a second state 404 entitled "environment attended". A subsequent exit by the entity causes a transition back to the first state 402. Alternatively, while in the second state 404, either of two alternative actions entitled "hand reaches for valve 1" or "hand reaches for valve 2" are specifically defined. Recognition of the former causes a transition to a third state 406 labeled "intend to use valve 1". A further consequence of transition to the third state 406 is the initiation of a system action 420, in this case the display of a warning and/or the presentation of training information. Within the third state 406, a potential known action labeled "valve 1 turned," if recognized, will cause a further transition to a fourth state 408 labeled "valve 1 open". Alternatively, while in the second state 404, recognition of the known action labeled "hand reaches for valve 2" causes transition to a fifth state 410 labeled "intend to use valve 2" and, relative to the fifth state 410, further recognition of the action labeled "valve 2 turned" causes a further transition to a sixth state 412 labeled "valve 2 open". In this instance, entry into the sixth state 412 results in a different system action 422 in which information confirming performance of a correct action is provided to the entity. As used herein, a system action comprises any effect or consequence initiated within the system 100 in response to a recognition of action or failure to recognize an action. By way of non-limiting example, a system action may be as simple as maintaining the current state or transitioning to another state, or as complex as causing an output to be provided to the entity.

As shown, a single task model is illustrated in FIG. 4. However, multiple task models can be defined for a given environment, which multiple task models may have overlapping states. In this manner, the present invention is able to account for the possibility of performing multiple tasks at the same time, or for the possibility of switching back and forth between tasks. For example, both a first and second task model may include a state called "pump A turned on". In the first task model, a transition-inducing action while in the "pump A turned on" state may be "reach for switch B", whereas in the second task model, a transition-inducing action while in the "pump A turned on" state may be "reach for supply valve C". If the "reach for supply valve C" action is subsequently recognized, this will have no effect on the first task model while simultaneously inducing a state transition in the second task model. By simultaneously maintaining state data for multiple models, the system can recognize a transition from one task to another, or the performance of multiple simultaneous tasks. Further still, if state transitions in multiple task models indicate the simultaneous or alternating performance of multiple tasks, the system can further recognize the proper performance of a complex task, or performance of incompatible tasks (e.g., alternating performance of "start pump X" and "close input valve Y") or potentially dangerous tasks (e.g., simultaneous performance of the "arm the weapon" and "begin countdown" tasks). In any of these cases, appropriate information may be provided to the entity performing the multiple tasks.

As noted above, the controller 102 uses the state information and known actions provided by the one or more task models to analyze the position data provided by the positioning system 104 and thereby recognize the occurrence of actions within the environment 106. Furthermore, the controller 102 may be coupled to a second database 109 comprising information that may be selectively provided to the entity 108 based on the actions recognized by the controller 102. The information included within the second database 109 may include information represented in any suitable format or media for presentation to the entity 108 via the communication unit 116 and intervening communication system 114. For example, the information may comprise recorded audio, still image or video instructions for performing a task, or warnings concerning performance of the task, or information concerning other events within or external to the environment 106. The present invention is not limited with regard to the format or content of the information within the second database 109. Furthermore, techniques for deploying databases as may be used in connection with the controller 102 are well known to those having skill in the art.

In an additional aspect of the present invention, actions recognized and interpreted by the controller 102 may be associated with event data captured by an event capture system 118 and provided to a logging controller 124 as shown. As used herein, event data is information about the occurrence of an event or the state of an element or area, without regard to the representational format of the information or media in which it is stored. As such, the event capture system 118 may comprise, by way of non-limiting examples, a video or image surveillance system, an audio recording system, a system of environmental sensors, a system for reporting the state of various pieces of equipment, combinations of such systems, etc. Furthermore, as illustrated in FIG. 1, the event capture system 118 is associated with an area or region 120 that may or may not overlap with the environment 106. For example, when the controller 102 recognizes that a certain action has been performed on a certain element within the environment 106, it may be desirable to capture event data corresponding to the performance of the action upon the element. Alternatively, it may be desirable to capture event data corresponding to an area or element that is only partially within, or entirely external to, the environment 106.

Regardless, under the direction of the controller 102, the logging controller 124 may be instructed to obtain the necessary event data from the event capture system 118 and thereafter associate the action (provided by the controller 102 to the logging controller 124) with the event data in any suitable manner. Optionally, the event capture system 118 may communicate directly with the controller 102 as a matter of design choice. Further still, information obtained directly by the controller 102 from elements 112 within the environment 106 may constitute event data as contemplated herein. In a presently preferred embodiment, the logging controller 124 stores information about actions recognized by the controller 102 and the associated event data in a log data database 126. The event data provided by the event capture system 118 may comprise data represented in virtually any suitable media format such as audio, still images, text, full motion video or any other suitable format. Furthermore, when associating the recognized actions with the captured event data, the recognized action may be used to annotate or index the captured event data. For example, where the event data comprises video data, the recognized action associated with that captured video data may be used to provide text annotation in the form of an overlay in the video data. Other suitable techniques for associating the recognized actions with the captured event data are known to those of skill in the art.

Figure 2:
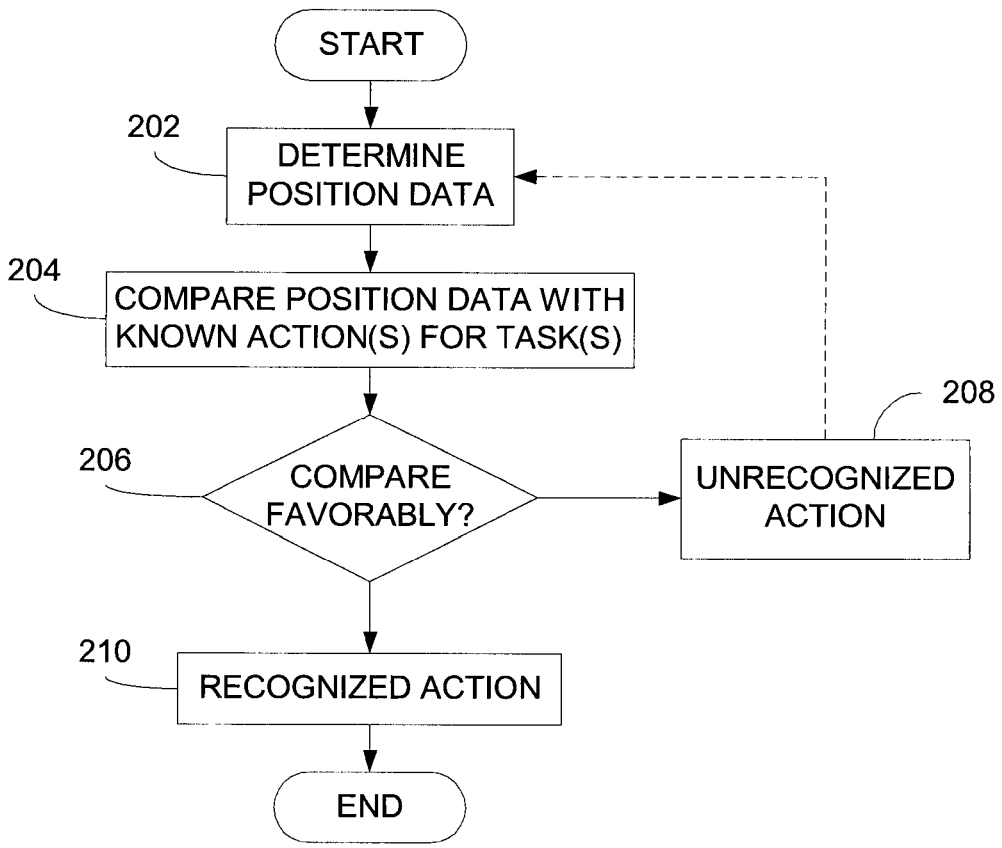
FIG. 2 is a flowchart of a method for recognizing an action within an environment in accordance with the present invention.

FIG. 2 is a flowchart illustrating a method for performing action recognition in accordance with the present invention. In a presently preferred embodiment, the processing illustrated in FIG. 2, except as otherwise noted, is carried out as steps performed by an appropriately programmed, processor-equipped device such as the controller 102 shown in FIG. 1. However, those having ordinary skill in the art will appreciate that other implementation platforms such as programmable logic or application specific integrated circuits may be equally employed to implement the processing illustrated in FIG. 2. Furthermore, centralized processing, i.e., by a single device, is not required and a distributed processing scheme may be equally employed. Regardless, at block 202 position data is determined via a PPS 104. As described above, the position data comprises one or more sets of spatial coordinates reflecting movement of an entity within an environment covered by the precision positioning system. In the context of FIG. 2, the determination of the position data may simply comprise receiving the position data from the precision positioning system or, in an alternate embodiment, may comprise receiving raw data directly from the detectors within the positioning system and further processing the raw data in order to determine the actual position data. In a preferred embodiment, the position data comprises a periodic stream of spatial coordinates at time intervals sufficient to capture specific movements of interest. For example, position data received at a frequency of once per second may be insufficient to discriminate between relatively quick movements of the hands. In applications where such precision is required, the frequency of the position data may be increased to several times per second as known in the art. Alternatively, where such precision is not required or where there is a desire to reduce the quantity of position data, the frequency may be decreased.

As position data is received or otherwise determined, processing continues at block 204 where the position data is compared with one or more known actions corresponding to one or more predetermined tasks defined within the environment. Furthermore, in a preferred embodiment, the one or more known actions may be defined relative to a particular element within the environment. For example, relative to a valve within an environment, known actions may comprise turning the valve to the left or right. Alternatively, for a lever within the environment, known actions may comprise moving the lever in one direction or in the opposite direction.

Those having skill in the art will appreciate that these are merely simple illustrations of the general concept of defining actions relative to specific elements upon which such actions may be performed. To the extent that movements within space may be represented as a series of spatial coordinates over a period of time, the known actions may be compared with the position data determined at block 202. For example, where spatial coordinates are described as three-dimensional {x, y, z} coordinates, a simple movement such as moving from left to right may be defined as a series of spatial coordinates in which two of the three spatial coordinates (e.g., the y and z coordinates) remain substantially the same, whereas the third spatial coordinate (e.g., the x coordinate) changes in a relatively uniform manner. Those having ordinary skill in the art will appreciate that any of a variety of moments may be defined in this manner as a series of spatial coordinates over a period of time. With actions defined in this manner, the comparison of position data with the actions can be reduced to a correlation operation (which may comprise operations of varying complexity, e.g., learned from previous data), with recognition of an action being indicated by correlation values above a recognition threshold. As known in the art, it may be necessary to appropriately scale, rotate or otherwise normalize the position data in order to accurately compare the position data and the one or more known actions.

Regardless, at block 206 it is determined whether the comparison of the position data with the one or more known actions has compared favorably, e.g., whether correlation between the position data and a known action has exceeded a correlation threshold. If not, processing continues at block 208 wherein an unrecognized action is determined. In this case, processing preferably continues at block 202 where additional position data is determined and processing continues as described above. However, it may be desirable to discontinue recognition processing as illustrated by the dashed arrow exiting block 208. Conversely, if the comparison is favorable, the processing continues at block 210 where a recognized action is returned. For example, each of the known actions may have associated therewith an identifier such as a text label or similar mechanism that may be used to distinguish the known actions from each other. Thus, when one of the known actions is identified through the comparison process, the corresponding identification may be returned for further processing.

Figure 3:
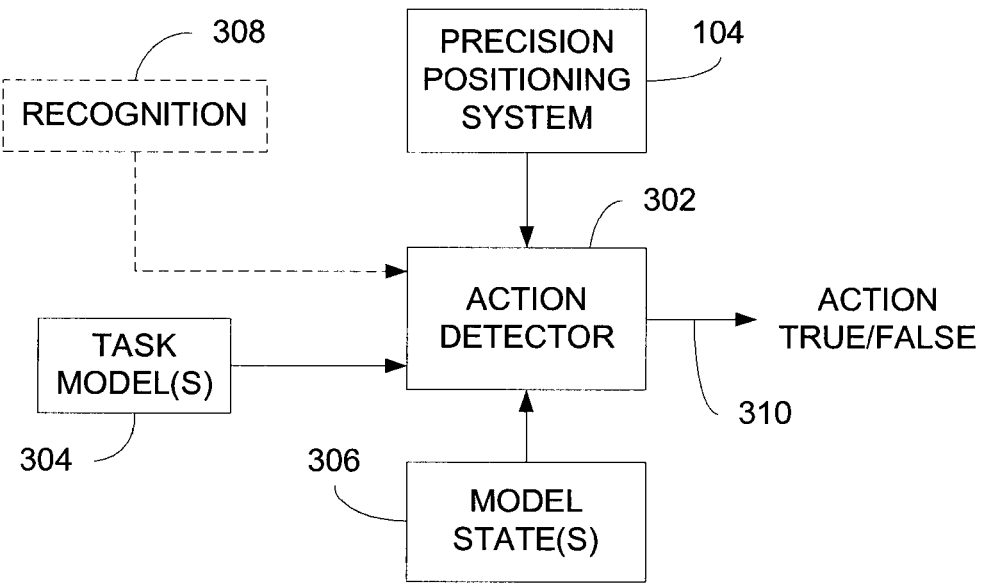
FIG. 3 is a schematic block diagram illustrating an implementation of action recognition and interpretation in accordance with the present invention.

Referring now to FIG. 3, a schematic block diagram of an exemplary implementation of action recognition and interpretation in accordance with the present invention is further illustrated. In particular, the implementation shown in FIG. 3 may be used to carry out the processing described above relative to FIG. 2. An action detector 302 is provided that takes as input the position data provided by the PPS 104 as well as model state information 306 and known actions from the task model 304. In a presently preferred embodiment, the action detector 302 is implemented by one or more processes implemented by the controller 102 shown in FIG. 1. Both the task model 304 and model state information 306 are preferably stored as one or more data structures in suitable storage devices, such as the first database 107 illustrated in FIG. 1. Optionally, an entity recognition system 308 may be employed to provide information identifying specific entities. In practice, particularly where the PPS 104 employs uniquely identifiable tags, this function may be subsumed within the PPS 104. However, systems such as facial recognition systems, keycard systems or other systems known to those of skill in the art may be employed for this purpose. The action recognition process may take into account the identity of the entity performing the action, as provided by the recognition system 308. This may be useful, for example, in enforcing compliance with authorizations for various tasks.

As described above relative to FIG. 2, the action detector 302 receives position data from the PPS 104 or, at least, raw data from the PPS 104 sufficient for the action detector 302 to determine the position data. Based on the one or more task models 304 and state information 306, as described above, the action detector 302 determines whether a given action has been recognized and provides a suitable output 310 to that effect. For example, the output 310 may comprise one or more true/false values corresponding to at least one known actions for each of one or more task models. Alternatively, or in addition, the output 310 may comprise an identifier of the specific action recognized. As shown, the action detector 302 may update the model state information 306 based on the outcome of the action recognition process.

Figure 5:
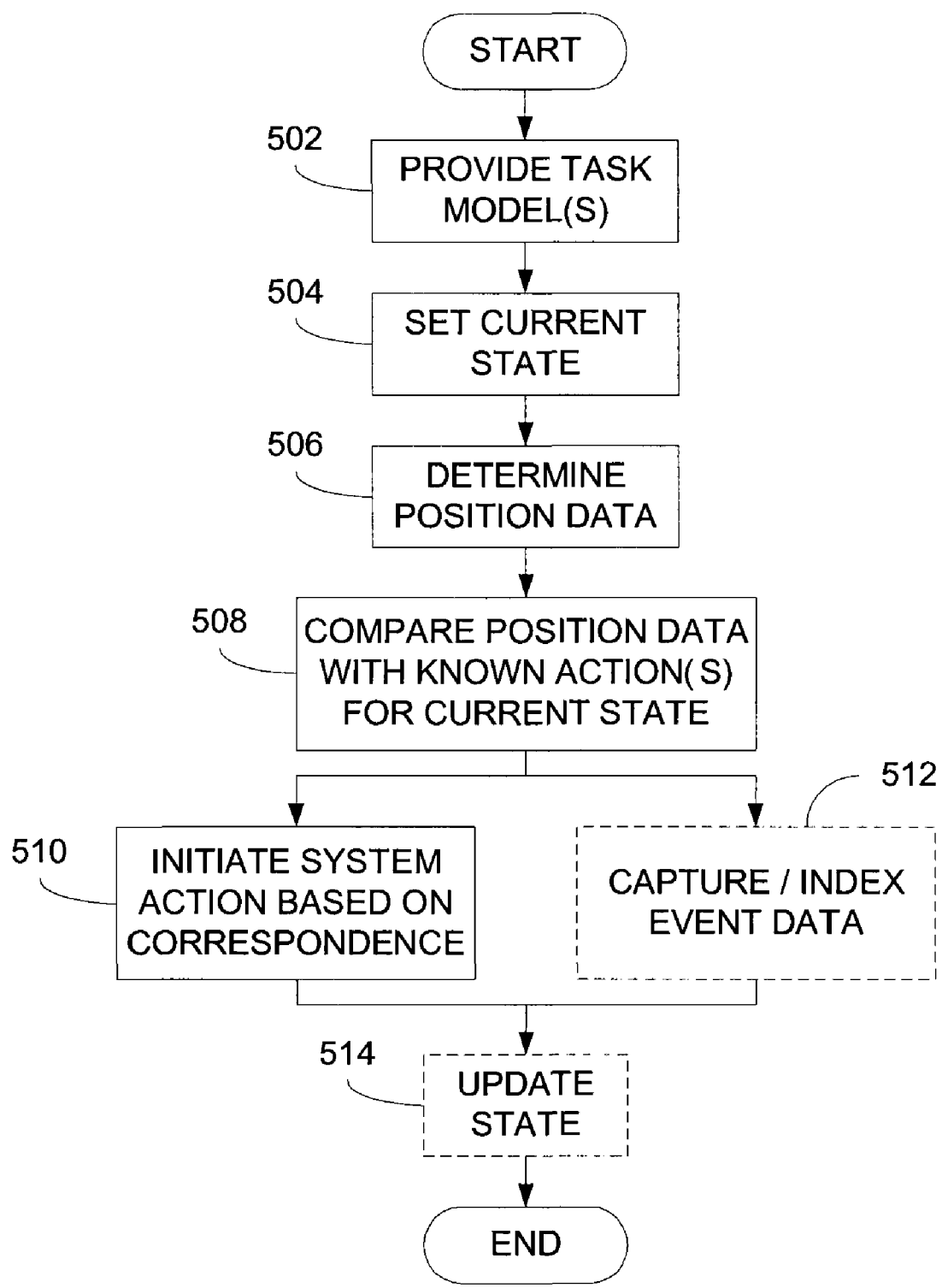
FIG. 5 is a flowchart illustrating a method for interpreting actions within an environment and logging event data in accordance with the present invention.

Referring now to FIG. 5, processing in accordance with an additional embodiment of the present invention is further illustrated. As before, the processing illustrated in FIG. 5, except as otherwise noted, is carried out as steps performed by an appropriately programmed, processor-equipped device such as the controller 102 shown in FIG. 1. However, those having ordinary skill in the art will appreciate that other implementation platforms such as programmable logic or application specific integrated circuits may be equally employed to implement the processing illustrated in FIG. 2. Furthermore, centralized processing is not required and a distributed processing scheme may be equally employed. Thus, at block 502, one or more task models are provided, preferably in the form of stored data structures, as described above. In one aspect of the present invention, a user interface provided by the controller 102 may be used to manage the deployment and maintenance of task models. As an initialization procedure, at block 504, for each task model, a current state is set corresponding to an initial state for that task. Thereafter, at block 506, position data is determined as described above. The position data is subsequently compared with one or more known actions for the current state at block 508. As described previously, for any given state, one or more known actions may be provided as a template against which the position data may be compared in order to recognize certain actions being performed by an entity within the environment. Proceeding to block 510, one or more system actions may be initiated based on the correspondence of the position data to the one or more known actions. As used herein, "correspondence" may cover a spectrum of values from a complete lack of correspondence as in the case where the position data does not match any of the known actions all the way to exact correspondence between the position data and one of the known actions. As a result, the system action initiated based on the correspondence may be completely different depending on the degree of the correspondence. Simultaneously, at block 512, event data is captured and/or indexed in accordance with any action recognized at block 510. Thereafter, at block 514 processing may optionally continue by updating the state based on the recognition (or lack of recognition) of an action as determined at block 510.

As described above, the present invention provides a technique for recognizing and interpreting actions performed by an entity within an environment. This is achieved through the use of a precision positioning system the provides position data for comparison against known tasks defined in task models. When the position data leads to a recognized action, one or more system actions may be initiated, including the provision of information to the entity or the capture and recording of event data in association with the recognized action. For at least these reasons, the present invention represents an advancement over prior art techniques.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

What is claimed is:

1. In an environment comprising a precision positioning system adapted to provide position information corresponding to an entity within the environment and an entity recognition system adapted to provide information identifying the entity, a method of recognizing an action undertaken by the entity within the environment, the method comprising:
   determining, by the entity recognition system, an identity of the entity;
   determining, by the precision positioning system, position data corresponding to at least a portion of the entity within the environment, the environment comprising a space substantially larger than the entity;
   comparing the position data to at least one known action corresponding to a predetermined task within the environment;
   recognizing the action when the position data compares favorably with the at least one known action; and
   determining whether the entity is authorized to perform the action based on the identity of the entity.

2. The method of claim 1, wherein the at least one known action is defined relative to an element within the environment.

3. The method of claim 2, wherein the at least one known action comprises at least one of: approaching the element with a velocity within a velocity range or approaching the element at a distance within a distance range.

4. The method of claim 2, wherein the entity comprises the element and wherein the at least one known action comprises movement of the element.

5. The method of claim 1, wherein the at least one known action comprises, relative to an area, at least one of: entering the area, exiting the area, entering the area from an entry direction, exiting the area at an exit direction or remaining within the area for a period of time.

6. The method of claim 1, wherein the at least one known action comprises movements of a predetermined length.

7. A system for recognizing an action performed by an entity within an environment, comprising:
   an entity recognition system, associated with the environment and adapted to determine an identity of the entity;
   a precision positioning system comprising a plurality of detectors associated with the environment;
   at least one tag, physically associated with the entity and in communication with at least some of the plurality of detectors, wherein the precision positioning system via the at least some of the plurality of detectors provides position data corresponding to the at least one tag, the position data describing the action by the entity; and
   a controller, in communication with the plurality of detectors and the entity recognition system, operative to recognize the action based on correspondence of the position data to one or more reference actions corresponding to a predetermined task within the environment and to determine whether the entity is authorized to perform the action based on the identity of the entity.

8. The system of claim 7, wherein the precision positioning system comprises an ultra-wideband positioning system.

9. The system of claim 7, wherein the entity comprises a human, and wherein the at least one tag is configured to be physically associated with any extremity of the human.

10. The system of claim 7, further comprising:
a first database, in communication with the controller, comprising data structures corresponding to at least one task model describing a plurality of states and, for each of the plurality of states, at least one known action to provide the one or more references actions.

11. The system of claim 7, further comprising:
a second database, in communication with the controller, comprising information to be selectively provided to the entity based on the action.

12. The system of claim 11, further comprising:
a communication system coupled to the controller operative to send selected information to the entity; and
a communication device, operative within the communication system and associated with the entity, for receiving the selected information and providing the selected information to the entity.

13. The system of claim 7, further comprising:
a logging controller, in communication with the controller, operative to record the occurrence of the action in a third database coupled to the logging controller.

14. The system of claim 13, further comprising:
an event capture system, coupled to the logging controller, that provides event data based on the position data, wherein the logging controller associates the occurrence of the action with at least a portion of the event data in the third database.

15. The system of claim 14, wherein the event data capture system is associated with the environment.

16. The system of claim 7, wherein the entity recognition system comprises at least one of a facial recognition system and a keycard system.

17. An apparatus comprising:
at least one processor; and
at least one storage device, coupled to the at least one processor, comprising processor-executable instructions that, when executed by the at least one processor, cause the at least one processor to:
receive, from an entity recognition system associated with an environment comprising a space substantially larger than an entity within the environment, an identity of the entity;
receive, from a precision positioning system adapted to provide position information corresponding to the entity, position data corresponding to at least a portion of the entity within the environment;
compare the position data to one or more reference actions corresponding to a predetermined task within the environment;
recognize the action when the position data compares favorably with a reference action of the one or more reference actions; and
determine whether the entity is authorized to perform the action based on the identity of the entity.

18. The apparatus of claim 17, wherein the at least one storage device further comprises data structures corresponding to a task model for the predetermined task describing a plurality of states and, for each of the plurality of states, at least one known action to provide the one or more references actions, and wherein the at least one storage device further comprises processor-executable instructions that, when executed by the at least one processor, cause the at least one processor to:
initiate at least one system action based on a current state of the plurality of states and correspondence of the position data to the at least one known action.

* * * * *